United States Patent
Chou et al.

(10) Patent No.: US 9,805,472 B2
(45) Date of Patent: Oct. 31, 2017

(54) SYSTEM AND METHOD FOR SMOKE DETECTION DURING ANATOMICAL SURGERY

(71) Applicant: SONY CORPORATION, Tokyo (JP)

(72) Inventors: Chen-Rui Chou, San Jose, CA (US); Ming-Chang Liu, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/862,437

(22) Filed: Sep. 23, 2015

(65) Prior Publication Data
US 2016/0239967 A1 Aug. 18, 2016

Related U.S. Application Data

(60) Provisional application No. 62/117,815, filed on Feb. 18, 2015.

(51) Int. Cl.
G06K 9/00 (2006.01)
G06T 7/00 (2017.01)
G06T 7/11 (2017.01)

(52) U.S. Cl.
CPC ............ *G06T 7/0081* (2013.01); *G06T 7/11* (2017.01); *G06T 2207/10016* (2013.01); *G06T 2207/10068* (2013.01); *G06T 2207/20076* (2013.01); *G06T 2207/20224* (2013.01); *G06T 2207/30004* (2013.01); *G06T 2207/30168* (2013.01)

(58) Field of Classification Search
USPC ................................................. 382/128–134
See application file for complete search history.

(56) References Cited

U.S. PATENT DOCUMENTS

| 6,842,196 B1 | 1/2005 | Swift et al. | |
| 2006/0115154 A1* | 6/2006 | Chen | G08B 29/186 382/181 |
| 2007/0282506 A1* | 12/2007 | Breed | B60N 2/028 701/45 |

(Continued)

FOREIGN PATENT DOCUMENTS

| EP | 2368484 A | 9/2011 |
| EP | 2532299 A | 12/2012 |
| EP | 2754383 A | 7/2014 |

OTHER PUBLICATIONS

International Search Report and Written Opinion received for PCT Application No. PCT/US2016/017106, dated Apr. 22, 2016, p. 7.

*Primary Examiner* — Alex Liew
(74) *Attorney, Agent, or Firm* — Chip Law Group

(57) ABSTRACT

Various aspects of a system and method for smoke detection during an anatomical surgery are disclosed herein. In accordance with an embodiment of the disclosure, the method is implementable in a surgical scene analysis engine, which is communicatively coupled to an image-capturing device that captures one or more video frames. The method includes the estimation of a partially visible region in a current video frame, based on a temporal difference between the current video frame and a previous video frame from the one or more video frames. Thereafter, one or more candidate pixels are detected in the estimated partially visible region in the current video frame. Further, a smoke region is determined in the partially visible region, based on pruning of one or more candidate pixels.

19 Claims, 6 Drawing Sheets

(56) References Cited

U.S. PATENT DOCUMENTS

| | | | |
|---|---|---|---|
| 2008/0013809 A1* | 1/2008 | Zhu | A61B 34/20 |
| | | | 382/128 |
| 2008/0063298 A1* | 3/2008 | Zhou | G06K 9/3275 |
| | | | 382/280 |
| 2008/0205753 A1* | 8/2008 | Chen | G06K 9/325 |
| | | | 382/165 |
| 2009/0148001 A1* | 6/2009 | Artyushkova | G06T 7/20 |
| | | | 382/107 |
| 2009/0219389 A1* | 9/2009 | Marbach | G08B 17/125 |
| | | | 348/143 |
| 2010/0073477 A1* | 3/2010 | Finn | G08B 17/125 |
| | | | 348/143 |
| 2012/0116222 A1 | 5/2012 | Sawada et al. | |
| 2012/0182409 A1* | 7/2012 | Moriyama | A61B 1/00006 |
| | | | 348/65 |
| 2012/0281076 A1 | 11/2012 | Seki et al. | |

\* cited by examiner

SYSTEM AND METHOD FOR SMOKE DETECTION DURING ANATOMICAL SURGERY

CROSS-REFERENCE TO RELATED APPLICATIONS/INCORPORATION BY REFERENCE

This application claims priority to U.S. Provisional Patent Application Ser. No. 62/117,815 filed on Feb. 18, 2015, the entire content of which is hereby incorporated by reference.

FIELD

Various embodiments of the disclosure relate to system and method for smoke detection. More specifically, various embodiments of the disclosure relate to system and method for smoke detection during anatomical surgery.

BACKGROUND

With recent advancements in the field of medical science, various surgical and diagnostic procedures can now be performed by use of minimally invasive techniques. Such minimally invasive techniques may require small incisions to insert endoscopic or laparoscopic surgical instruments through the patient's skin into a body cavity that need to be operated upon. At least one of the endoscopic and/or laparoscopic tools includes an in-built camera to capture video images of the body cavity. The camera may enable a physician to navigate the endoscopic and/or laparoscopic surgical tools through the body cavity to reach an anatomical region on which the surgical or diagnostic procedure is to be performed. Other endoscopic and/or laparoscopic tools may perform the surgical operations on the tissues of the anatomical region.

In certain scenarios, during such surgical or diagnostic procedures, smoke may appear in the body cavity. For instance, when localized heat is applied to the anatomical region by use of the endoscopic or laparoscopic surgical instrument, temperature in the body cavity may change. This change in temperature may lead to the formation of mist or smoke inside the body cavity. The appearance of the mist or smoke in the body cavity may hinder the visibility of the physician. Consequently, the quality of the video footage captured by the endoscopic camera may deteriorate due to the mist or smoke. Hence, detection and removal of such mist or smoke that may appear during the surgical or diagnostic procedures may be essential. However, the detection of mist or smoke may be prone to many intrinsic and extrinsic challenges. An example of the intrinsic challenge in the smoke detection may include frequent changes in appearance of the smoke. Various examples of the extrinsic challenges in the smoke detection may include, but are not limited to, motion blur (that may be caused by motion of camera, surgical gauze, and/or surgical tools), halo effect, and/or smoke-ish appearance of white colored tissues. Therefore, to overcome the aforementioned challenges, there is a need for a method and/or system to detect smoke in the video footage captured by the endoscopic camera, and improve the quality of the video footage.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method for smoke detection during anatomical surgery substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
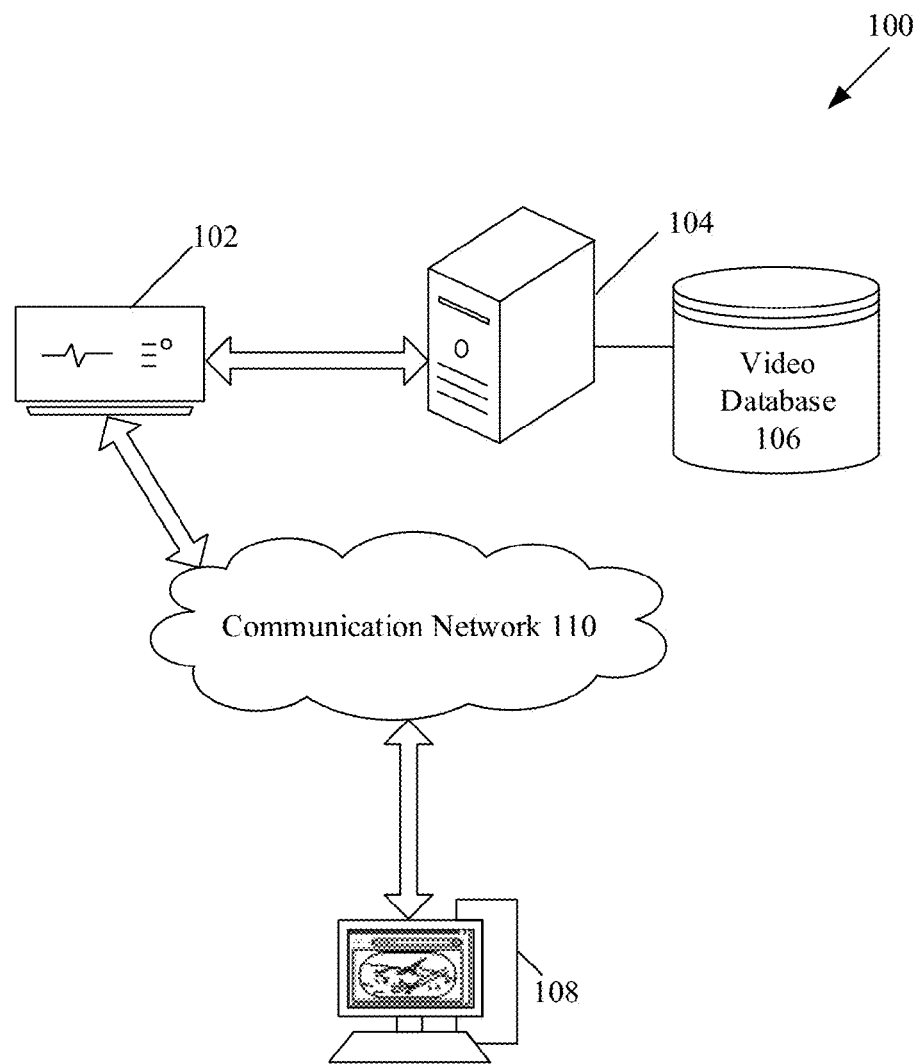
FIG. 1 is a block diagram that illustrates a network environment, in accordance with an embodiment of the disclosure.

The following described implementations may be found in disclosed system and method for smoke detection during an anatomical surgery. Exemplary aspects of the disclosure may include a method implementable in an image processing engine. The image processing engine may be communicatively coupled to an image-capturing device. The image-capturing device may be configured to capture one or more video frames. The method may include the estimation of a partially visible region in a current video frame, based on a temporal difference between the current video frame and a previous video frame received from the image-capturing device. Thereafter, one or more candidate pixels may be detected in the estimated partially visible region in the current video frame. Further, a smoke region may be determined in the partially visible region, based on pruning of the detected one or more candidate pixels.

In accordance with an embodiment, entropy of a histogram of the temporal difference between the current video frame and the previous video frame may be determined. The estimation of the partially visible region may be based on the determined entropy. In accordance with an embodiment, the detection of the one or more candidate pixels may be based on a difference of average intensity of corresponding image blocks of the current video frame and the previous video frame. In accordance with an embodiment, the one or more candidate pixels may correspond to one or more of a smoke block, a tissue block, and/or a non-tissue block.

In accordance with an embodiment, one or more false-positive candidate pixels may be determined from the detected one or more candidate pixels. The pruning of the detected one or more candidate pixels may include removal of the determined one or more false-positive candidate pixels from the detected one or more candidate pixels. In accordance with an embodiment, the one or more false-positive candidate pixels may comprise, but are not limited to, a first set of pixels in a motion-blurred region in the current video frame and a second set of pixels in a halo-effected region in the current video frame. The motion-blurred region may be detected by use of one or more of an optical flow based technique or an artefact-detection technique. In accordance with an embodiment, the halo-affected region may be detected by use of a region growth-rate estimation technique.

In accordance with an embodiment, one or more first edge pixels may be identified in the current video frame and one or more second edge pixels may be identified in the previous video frame, by use of an edge detection technique. The motion-blurred region may be detected based at least on a difference in location of the one or more first edge pixels from the one or more second edge pixels. In accordance with an embodiment, the motion-blurred region may correspond to a region in the current video frame that may encompass a movement of one or more of the image-capturing device, a non-tissue object, and/or a tissue portion.

In accordance with an embodiment, one or more image-capture settings of the image-capturing device may be adjusted, based on the determination of the smoke region. Examples of the one or more image-capture settings may include, but are not limited to, an automatic exposure, an automatic focus, an automatic white balance, or an automatic illumination.

In accordance with an embodiment, the current video frame may be displayed to a user (such as a physician) via a user interface (UI) during the surgical procedure in real-time. The determined smoke region may be masked or highlighted in the current video frame displayed to the user via the user interface. In accordance with an embodiment, a notification indicative of the determination of the smoke region may be generated. Examples of the notification may include, but are not limited to, an audio alert, a textual alert, a visual alert, or a haptic alert.

FIG. 1 is a block diagram that illustrates a network environment, in accordance with an embodiment of the disclosure. With reference to FIG. 1, there is shown a network environment 100. The network environment 100 may include a surgical device 102, an image processing server 104, a video database 106, a user terminal 108, and a communication network 110. The surgical device 102 may be communicatively coupled with the image processing server 104, the video database 106, and the user terminal 108, via the communication network 110.

The surgical device 102 may comprise suitable logic, circuitry, interfaces, and/or code that may be configured to perform one or more surgical procedures and/or diagnostic analysis associated with one or more anatomical regions of a patient. Examples of the surgical device 102 may include, but are not limited to, a minimally invasive surgical/diagnostic device, a minimal incision surgical/diagnostic device, and/or an endoscopic/laparoscopic surgical/diagnostic device.

In accordance with an embodiment, the surgical device 102 may further include an image-capturing device (not shown in FIG. 1). The image-capturing device may capture one or more video frames of an anatomical region of a patient when a surgery or diagnostic procedure is performed on the anatomical region. Alternatively, the surgical device 102 may be communicatively coupled to the image-capturing device, via the communication network 110. Examples of the image-capturing device may include, but are not limited to, an endoscopic/laparoscopic camera, an ultrasound imaging device, a medical resonance imaging (MRI) device, a computer tomography (CT) scanning device, a minimally invasive medical imaging device, and/or a minimal incision medical imaging device.

The image processing server 104 may comprise one or more servers that may provide an image processing service to one or more subscribed electronic devices, such as the user terminal 108 and/or the surgical device 102. In accordance with an embodiment, the image processing server 104 may be configured to analyze the one or more video frames captured by the image-capturing device while the surgical or diagnostic procedure is performed. The image processing server 104 may then detect one or more smoke regions in the one or more video frames, based on the analysis of the one or more video frames. In accordance with an embodiment, the image processing server 104 may be implemented as a plurality of cloud-based resources by use of several technologies that are well known to those skilled in the art. Further, the image processing server 104 may be associated with a single or multiple service providers. Examples of the image processing server 104 may include, but are not limited to, Apache™ HTTP Server, Microsoft® Internet Information Services (IIS), IBM® Application Server, Sun Java™ System Web Server, and/or a file server.

A person with ordinary skill in the art will understand that the scope of the disclosure is not limited to implementation of the image processing server 104 and the surgical device 102 as separate entities. In accordance with an embodiment, the functionalities of the image processing server 104 may be implemented by the surgical device 102, without departure from the scope of the disclosure.

The video database 106 may store a repository of the one or more video frames captured by the image-capturing device. In accordance with an embodiment, the video database 106 may be communicatively coupled to the image processing server 104. The video database 106 may receive the one or more video frames, via the image processing server 104, when the image-capturing device captures the one or more video frames. In accordance with an embodiment, the video database 106 may be implemented by use of various database technologies known in the art. Examples of the video database 106 may include, but are not limited to, Microsoft® SQL Server, Oracle®, IBM DB2®, Microsoft Access®, PostgreSQL®, MySQL®, and/or SQLite®. In accordance with an embodiment, the image processing server 104 may connect to the video database 106, based on one or more protocols. Examples of such one or more protocols may include, but are not limited to, Open Database Connectivity (ODBC)® protocol and Java Database Connectivity (JDBC)® protocol.

A person with ordinary skill in the art will understand that the scope of the disclosure is not limited to implementation of the image processing server 104 and the video database 106 as separate entities. In accordance with an embodiment, the functionalities of the video database 106 may be implemented by the image processing server 104, without departure from the spirit of the disclosure.

The user terminal 108 may comprise suitable logic, circuitry, interfaces, and/or code that may be configured to present a user interface (UI) to display the one or more video frames to a user, such as a physician. In accordance with an embodiment, the user terminal 108 may display the one or more video frames, in real time, while the surgical or diagnostic procedure is performed on the anatomical region of the patient. The user terminal 108 may be further configured to display the one or more smoke regions that are detected in each of the one or more video frames by the image processing server 104. Examples of the user terminal 108 may include, but are not limited to, a smartphone, a camera, a tablet computer, a laptop, a wearable electronic device, a television, an Internet Protocol Television (IPTV), and/or a Personal Digital Assistant (PDA) device.

A person with ordinary skill in the art will understand that the scope of the disclosure is not limited to implementation of the user terminal 108 and the image processing server 104 as separate entities. In accordance with an embodiment, the functionalities of the image processing server 104 may be implemented by the user terminal 108 without departure from the spirit of the disclosure. For example, the image processing server 104 may be implemented as an application program that runs and/or is installed on the user terminal 108.

A person skilled in the art will understand that in accordance with an embodiment, the user terminal 108 may be integrated with the surgical device 102. Alternatively, the user terminal 108 may be communicatively coupled to the surgical device 102 and a user of the user terminal 108, such as a physician, may control the surgical device 102 via a UI of the user terminal 108.

The communication network 110 may include a medium through which the surgical device 102 and/or the user terminal 108 may communicate with one or more servers, such as the image processing server 104. Examples of the communication network 110 may include, but are not limited to, the Internet, a cloud network, a Wireless Fidelity (Wi-Fi) network, a Wireless Local Area Network (WLAN), a Local Area Network (LAN), a plain old telephone service (POTS), and/or a Metropolitan Area Network (MAN). Various devices in the network environment 100 may be configured to connect to the communication network 110, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

In operation, the image-capturing device may be configured to capture one or more video frames during an anatomical surgery. The one or more video frames may comprise at least a current video frame and a previous video frame. The image processing server 104 may be configured to estimate a partially visible region in the current video frame. In accordance with an embodiment, the estimation of the partially visible region may be based on a temporal difference between the current video frame and the previous video frame.

In accordance with an embodiment, the image processing server 104 may be further configured to determine entropy of a histogram of the temporal difference between the current video frame and the previous video frame. The estimation of the partially visible region may be based on the determined entropy. In accordance with an embodiment, the image processing server 104 may be configured to detect the one or more candidate pixels in the estimated partially visible region in the current video frame. The one or more candidate pixels may be detected based on a difference of average intensity of corresponding image blocks of the current video frame and the previous video frame. Examples of the one or more candidate pixels may correspond to, but are not limited to, a smoke block, a tissue block, and/or a non-tissue block.

In accordance with an embodiment, the image processing server 104 may be further configured to determine one or more false-positive candidate pixels from the detected one or more candidate pixels. The one or more false-positive candidate pixels may comprise a first set of pixels in a motion-blurred region in the current video frame, a second set of pixels in a halo-effected region in the current video frame, and/or the like.

In accordance with an embodiment, the image processing server 104 may be further configured to detect the motion-blurred region by use of one or more optical flow based techniques and/or artefact detection techniques. The motion-blurred region may correspond to a region in the current video frame that may encompass a movement of one or more of the image-capturing device, a non-tissue object, or a tissue portion. The motion-blurred region may be detected based on at least a difference in location of the one or more first edge pixels from one or more second edge pixels. In accordance with an embodiment, the image processing server 104 may identify the one or more first edge pixels in the current video frame and the one or more second edge pixels in the previous video frame, by use of an edge detection technique. In accordance with an embodiment, the image processing server 104 may be further configured to detect the halo-affected region by use of a region growth rate estimation technique.

The image processing server 104 may prune the detected one or more candidate pixels by removal of the determined one or more false-positive candidate pixels. Further, the image processing server 104 may be configured to determine a smoke region in the partially visible region, based on pruning of the detected one or more candidate pixels. In accordance with an embodiment, the image processing server 104 may be further configured to adjust one or more image-capture settings of the image-capturing device in real time, based on the determination of the smoke region. Examples of the one or more image-capture settings may include, but are not limited to, an automatic exposure, an automatic focus, an automatic white balance, or an automatic illumination.

In accordance with an embodiment, the image processing server 104 may be further configured to display the one or more video frames including the current video frame to a user (such as a physician), via a UI of the user terminal 108, while the surgical or diagnostic procedure is performed. The determined smoke region may be masked or highlighted in the current video frame displayed to the user, via the UI. In accordance with an embodiment, the image processing server 104 may be further configured to generate a notification indicative of the determination of the smoke region. The image processing server 104 may transmit the notification to the surgical device 102, and/or the user terminal 108. The notification may be presented to the user (such as the physician) by the surgical device 102 and/or the user terminal 108. Examples of the notification may include, but are not limited to, an audio alert, a textual alert, a visual alert, and/or a haptic alert.

In accordance with an embodiment, the image processing server 104 may also be configured to turn on a smoke evacuator (not shown in FIG. 1) associated with the surgical device 102. The smoke evacuator, when turned on, may be configured to remove smoke or mist present in the body cavity that is operated upon by use of the surgical device 102. A person skilled in the art will understand that in certain scenarios, the smoke evacuator may be implemented as a part of the surgical device 102. However, the scope of the disclosure should not be limited to this scenario. In accordance with an embodiment, the smoke evacuator may be implemented as a separate device, communicatively coupled to the surgical device 102, which may function in conjunction with the surgical device 102.

Figure 2:
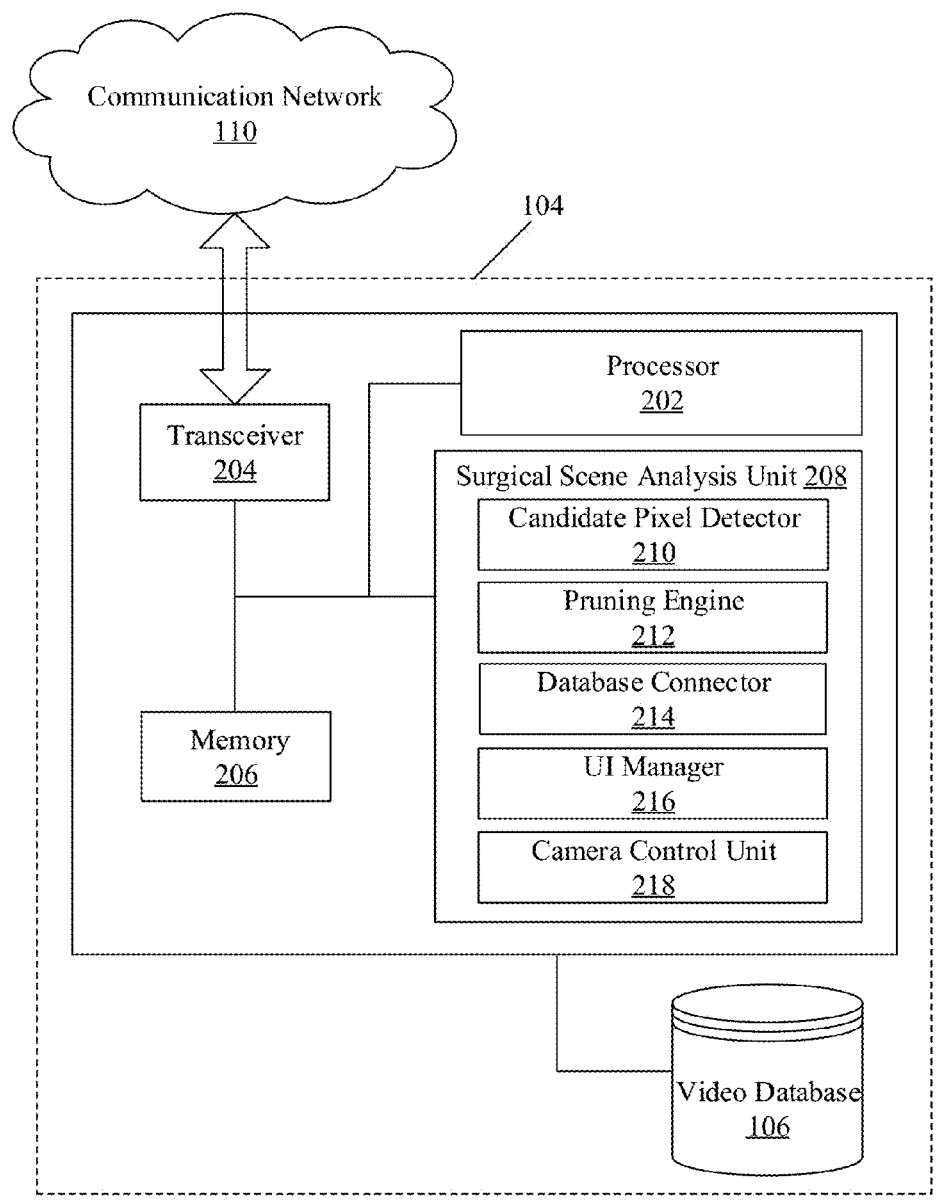
FIG. 2 is a block diagram that illustrates an exemplary image processing server, in accordance with an embodiment of the disclosure.

FIG. 2 is a block diagram that illustrates an exemplary image processing server, in accordance with an embodiment of the disclosure. FIG. 2 is explained in conjunction with elements from FIG. 1. With reference to FIG. 2, there is shown the image processing server 104. The image processing server 104 may comprise one or more processors, such as a processor 202, one or more transceivers, such as a transceiver 204, a memory 206, and a surgical scene analysis unit 208. The surgical scene analysis unit 208 may include a candidate pixel detector 210, a pruning engine 212, a database connector 214, a UI manager 216, and a camera control unit 218. In accordance with an embodiment, the image processing server 104 may be communicatively coupled to the video database 106, through the communication network 110, via the transceiver 204. Alternatively, the image processing server 104 may include the video database 106. For example, the video database 106 may be implemented within the memory 206.

The processor 202 may be communicatively coupled to the transceiver 204, the memory 206, and the surgical scene analysis unit 208. The transceiver 204 may be configured to communicate with the surgical device 102 and the user terminal 108, via the communication network 110.

The processor 202 may comprise suitable logic, circuitry, interfaces, and/or code that may be configured to execute a set of instructions stored in the memory 206. The processor 202 may be configured to analyze the detected one or more candidate pixels. Based on the analysis, the processor 202 may determine smoke regions in the current video frame. In accordance with an embodiment, the processor 202 may be configured to determine one or more false-positive candidate pixels from one or more candidate pixels detected by the candidate pixel detector 210. The processor 202 may be implemented, based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The transceiver 204 may comprise suitable logic, circuitry, interfaces, and/or code that may be configured to communicate with the user terminal 108 and/or the surgical device 102, via the communication network 110 (as shown in FIG. 1). The transceiver 204 may implement known technologies to support wired or wireless communication of the image processing server 104 with the communication network 110. The transceiver 204 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The transceiver 204 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The memory 206 may comprise suitable logic, circuitry, and/or interfaces that may be configured to store a machine code and/or a computer program with at least one code section executable by the processor 202. In accordance with an embodiment, the memory 206 may be further configured to store the one or more video frames captured by the image-capturing device. Examples of implementation of the memory 206 may include, but are not limited to, Random Access Memory (RAM), Read Only Memory (ROM), Hard Disk Drive (HDD), and/or a Secure Digital (SD) card.

The surgical scene analysis unit 208 may comprise suitable logic, circuitry, interfaces, and/or code that may be configured to analyze and process the one or more video frames captured by the image-capturing device. In accordance with an embodiment, the surgical scene analysis unit 208 may be a part of the processor 202. Alternatively, the surgical scene analysis unit 208 may be implemented as a separate processor or circuitry in the image processing server 104. In accordance with an embodiment, the surgical scene analysis unit 208 and the processor 202 may be implemented as an integrated processor or a cluster of processors that perform the functions of the surgical scene analysis unit 208 and the processor 202. In accordance with another embodiment, the surgical scene analysis unit 208 may be implemented as a computer program code, stored in the memory 206, which on execution by the processor 202 may perform the functions of the surgical scene analysis unit 208.

The candidate pixel detector 210 may comprise suitable logic, circuitry, interfaces, and/or code that may be configured to analyze the one or more video frames to detect one or more pixels that may be candidates for smoke detection. In accordance with an embodiment, the candidate pixel detector 210 may be configured to estimate a partially visible region in a current video frame from the one or more video frames. The partially visible region may be estimated, based on a temporal difference between the current video frame and a previous video frame from the one or more video frames. The candidate pixel detector 210 may be further configured to detect one or more candidate pixels in the estimated partially visible region of the current video frame. Such one or more candidate pixels may correspond to pixels that are selected for smoke detection. The one or more candidate pixels may correspond to, but are not limited to, a smoke block, a tissue block, or a non-tissue block.

The pruning engine 212 may comprise suitable logic, circuitry, interfaces, and/or code that may be configured to prune the one or more candidate pixels, detected by the candidate pixel detector 210. The pruning may include removal of the determined one or more false-positive candidate pixels from the detected one or more candidate pixels. Further, the pruning engine 212, in conjunction with the processor 202, may be configured to determine the smoke region in the partially visible region, based on the pruned one or more candidate pixels.

The database connector 214 may comprise suitable logic, circuitry, interfaces, and/or code that may be configured to provide the surgical scene analysis unit 208 with access and connectivity to the video database 106. In accordance with an embodiment, the database connector 214 may establish a database session between the surgical scene analysis unit 208 and the video database 106. Examples of one or more communication protocols used to establish the database session may include, but are not limited to, Open Database Connectivity (ODBC)® protocol and Java Database Connectivity (JDBC)® protocol.

The UI manager 216 may comprise suitable logic, circuitry, interfaces, and/or code that may be configured to manage a UI presented on the user terminal 108. In accordance with an embodiment, the UI manager 216 may provide a surgical scene interface to a user (such as a physician) of the user terminal 108. The surgical scene interface may be presented to the user on a display device of the user terminal 108, via a UI of the user terminal 108. In accordance with an embodiment, the surgical scene interface may be configured to display the one or more video frames including the current video frame to the user. The detected smoke region may be masked or highlighted in the current video frame displayed to the user via the surgical scene interface.

The camera control unit 218 may comprise suitable logic, circuitry, interfaces, and/or code that may be configured to communicate with the image-capturing device to adjust one or more image-capture settings of the image-capturing device. In accordance with an embodiment, the camera control unit 218 may be configured to determine such values of the one or more image-capture settings, which may be suitable or optimal to capture the one or more video frames, based on the determination of the smoke region. Thereafter, the camera control unit 218 may be configured to transmit the determined values of the one or more image-capture settings to the image-capturing device, via the transceiver 204. The image-capturing device may adjust its image-capturing settings, based on the corresponding values that are transmitted by the camera control unit 218. Examples of the one or more image-capture settings may include, but are not limited to, an automatic exposure, an automatic focus, an automatic white balance, or an automatic illumination.

In operation, a physician may perform a surgical or diagnostic procedure on an anatomical region of a patient, by use of the surgical device 102 and one or more surgical instruments. Examples of the one or more surgical instruments may include, but are not limited to, endoscopic catheters, surgical forceps, surgical incision instruments, and/or surgical gauzes. Examples of the surgical or diagnostic procedure may include, but are not limited to, a minimally invasive surgery/diagnosis procedure, a minimal incision surgery/diagnosis procedure, a laparoscopic procedure, and/or an endoscopic procedure. In accordance with an embodiment, the surgical or diagnostic procedure may be automated and performed by a surgical robot, without any supervision or direction from the physician. In accordance with an embodiment, the surgical or diagnostic procedure may be semi-automated and performed by the surgical robot, with one or more input signals and/or commands from the physician. In accordance with an embodiment, the image-capturing device (not shown in FIG. 1) may be communicatively coupled to (or included within) the surgical device 102. The image-capturing device may capture one or more video frames of the anatomical region in real time, while the surgical or diagnostic procedure is performed on the anatomical region. Thereafter, the surgical device 102 (or the image-capturing device itself) may transmit the captured video frames to the image processing server 104, via the communication network 110.

The transceiver 204, in the image processing server 104, may be configured to receive the one or more video frames from the surgical device 102, via the communication network 110. In accordance with an embodiment, the one or more video frames may be received as real-time streamed media content by use of a communication protocol, such as a real-time transport protocol, and/or a real-time streaming protocol (RTSP). The database connector 214 may be configured to establish a database session with the video database 106 and store the received video frames in the video database 106. Further, the video frames may also be stored in the memory 206.

The candidate pixel detector 210 may be configured to analyze the one or more video frames. In accordance with an embodiment, the video frames may be analyzed in a batch mode (offline processing), when a predetermined number of video frames are received from the surgical device 102. In accordance with an embodiment, the video frames may be analyzed on a real-time basis (online processing), upon receipt of each new video frame. The candidate pixel detector 210 may retrieve the video frames from the memory 206 or the video database 106 for analysis of the video frames.

In accordance with an embodiment, the candidate pixel detector 210 may be configured to estimate a partially visible region in a current video frame of the one or more video frames. The partially visible region may be estimated, based on a temporal difference between the current video frame and a previous video frame from the one or more video frames. In accordance with an embodiment, the candidate pixel detector 210 may divide both the current video frame and the previous video frame into respective image blocks. The candidate pixel detector 210 may determine a difference image, "D", for example, based on the temporal difference between the intensities of pixels in corresponding image blocks of the current video frame and the previous video frame. Thus, the intensities of pixels in the difference image, "D", computed by an expression, "$I_t - I_{t-1}$", where "$I_t$" represents an intensity of a pixel in current video frame, and "$I_{t-1}$" represents an intensity of a corresponding pixel in the previous video frame. Thereafter, the candidate pixel detector 210 may determine a histogram of pixel intensities, "hist($D_{block\_i}$)", in each image block of the difference image, where "$D_{block\_i}$" represents pixel intensities of pixels in the $i^{th}$ image block of the difference image, "D". Further, for each image block in the difference image, "D", the candidate pixel detector 210 may be configured to determine an entropy, "$E_{block\_i}$", of the histogram determined for that image block, where "block_i" represents $i^{th}$ image block of the difference image, "D". In accordance with an embodiment, the candidate pixel detector 210 may determine the entropy by use of equation (1) as follows:

$$E_{block_i} = \sum_{j=1}^{j=n} \text{hist}(D_{block_i})_j * \log(\text{hist}(D_{block_i})_j) \quad (1)$$

where, "n" represents number of bins in the histogram "hist($D_{block\_i}$)"; and
"hist($D_{block\_i}$)$_j$" represents number of pixels of the $i^{th}$ image block that lie in the $j^{th}$ bin of the histogram "hist($D_{block\_i}$)".

In accordance with an embodiment, the candidate pixel detector 210 may be configured to compare the entropy of the histogram determined for each image block of the difference image with a first predetermined threshold, such as "0.75". If the entropy for the $i^{th}$ image block, "$E_{block\_i}$", is less than the first predetermined threshold, such as "0.75", the corresponding $i^{th}$ image block of the current video frame may be identified as a portion of the partially visible region of the current video frame. In a similar manner, the candidate pixel detector 210 may identify various image blocks as portions of the partially visible region. The candidate pixel detector 210 may combine together the various image blocks that are identified as portions of the partially visible region to estimate the partially visible region.

In accordance with an embodiment, the candidate pixel detector 210 may be configured to detect one or more candidate pixels in the estimated partially visible region in the current video frame. Examples of the one or more candidate pixels, may include, but are not limited to, pixels that correspond to one or more of a smoke block, a tissue block, or a non-tissue block. In accordance with an embodiment, the detection of the one or more candidate pixels may be based on a difference of average pixel intensity of corresponding image blocks in the current video frame and the previous video frame. To detect the one or more candidate pixels, the candidate pixel detector 210 may determine average pixel intensities for such image blocks in the difference image, "D", which corresponds to the estimated partially visible region of the current video frame. Thereafter, based on a comparison of the average pixel intensities of such image blocks in the difference image, "D", with a second predetermined threshold, such as "1", the candidate pixel detector 210 may detect the one or more candidate pixels. For example, if the average pixel intensity of an image block of the difference image is greater than the second predetermined threshold, such as "1", the candidate pixel detector 210 may determine the pixels encompassed by the corresponding image block of the current video frame to be candidate pixels. In such a manner, the one or more candidate pixels may be detected in the estimated partially visible region of the current video frame.

In accordance with an embodiment, the processor 202 may be configured to determine one or more false-positive candidate pixels from the detected one or more candidate pixels. Examples of the one or more false-positive candidate pixels may include, but are not limited to, a first set of pixels in a motion-blurred region in the current video frame and a second set of pixels in a halo-effected region in the current video frame. In accordance with an embodiment, the processor 202 may be configured to detect the motion-blurred region by use of various image processing techniques, such as an optical flow based technique, an artefact detection technique, and/or the like. In accordance with an embodiment, the processor 202 may be configured to detect the halo-affected region by use of a region growth rate estimation technique.

In accordance with an embodiment, the motion-blurred region may correspond to a region in the current video frame that may encompass a movement of one or more of the image-capturing device, a non-tissue object (such as a surgical instrument or a surgical gauze), and/or a tissue portion. In accordance with an embodiment, the processor 202 may be configured to identify one or more first edge pixels in the current video frame and one or more second edge pixels in the previous video frame by use of an edge detection technique. The processor 202 may then detect the motion-blurred region based at least on a difference in location of the one or more first edge pixels from the one or more second edge pixels. In accordance with an embodiment, the processor 202 may use the optical flow based technique to detect movement associated with edge pixels of the current video frame, with respect to corresponding pixels of the previous video frame. The optical flow based technique may involve determination of an optical flow vector, "$\vec{v}$", and its squared magnitude, "$|\vec{v}|^2$", by use of equations (2) and (3), as follows:

$$\vec{v} = \frac{I_t - I_{t-1}}{\nabla i} \quad (2)$$

$$|\vec{v}|^2 \cong \frac{|(R, G, B)_t - (R, G, B)_{t-1}|^2}{F^2} \quad (3)$$

where, "$\vec{v}$" represents optical flow vector;
"$|\vec{v}|^2$" represents squared magnitude of the optical flow vector;
"$I_t$" represents intensity of pixels in current video frame;
"$I_{t-1}$" represents intensity of pixels in previous video frame;
"$\vec{\nabla I}$" represents motion vector of pixel intensities change between the previous video frame and the current video frame;
"$(R,G,B)_t$" represents red, green, and blue color components of pixels of the current video frame;
"$(R,G,B)_{t-1}$" represents red, green, and blue color components of pixels of the previous video frame; and
"$F^2$" represents square of spatial gradient magnitude in $(R,G,B)_t$ or $I_t$.

A person skilled in the art will understand that the optical flow based technique may be based on an assumption that the intensities of pixels that represent a same object may remain constant in the current and the previous video frame. However, due to motion blur, the intensity of pixels encompassed in a region associated with the movement of the object may change. Further, smoke pixels in the current video frame may violate the constant intensity assumption of the optical flow based technique. This may further exasperate the effect of motion blur on the application of the optical flow based technique. Based on the detection of the edge pixels, the motion of the object may be tracked with reference to the location of the edge pixels that may not be affected by motion blur. Further, the edge pixels may be distinctly perceivable even in the presence of smoke. Thus, the edge detection may reduce the omission of detection of valid candidate pixels, which may thereby reduce false-negatives in the detection of candidate pixels. Hence, false-negatives in the detection of candidate pixels may be reduced by the detection of the edge pixels and a subsequent implementation of the optical flow based technique on detected edge pixels.

In accordance with an embodiment, the processor 202 may determine whether an extent of motion blur within the video frame (or a region of the video frame) exceeds a predetermined motion blur threshold. Such motion blur may be due to a motion induced change in lighting in the video frame (or its region). In case the extent of motion blur exceeds the predetermined motion blur threshold, the video frame may not be analyzed further and smoke detection in the video frame (or its region) may be skipped. Accordingly, false-positive candidate pixels, created by the motion blur or halo effect in the candidate block may be prevented. For instance, the processor 202 may determine the size of the motion blurred region and/or the average intensity of pixels in the motion blurred region. If the size of the motion blurred region is greater than a size threshold and/or the average intensity of pixels in the motion blurred region is greater than an intensity threshold, the processor 202 may not process the video frame (or its region) further. Thus, in this case, the determination of smoke in the video frame (or its region) may be skipped.

A person skilled in the art will appreciate that the presence of smoke in the video frame (or its region) may lead to an erroneous estimation of motion in the video frame (or its region). In certain scenarios, this erroneous estimated motion blur may exceed the predetermined motion blur threshold. In such a case, the video frame (or its region) may not be processed for smoke detection, and hence, may be skipped. However, as explained above, edge pixels may be perceivable even in the presence of smoke. Hence, the detection of edge pixels may reduce errors in motion estimation, thereby reducing false skipping of the video frame (or its regions) for smoke detection.

In accordance with an embodiment, the candidate pixel detector 210 may check whether smoke is present in a collocated image block in the video frame (such as an image block in the vicinity of a specific image block). When the smoke is present in the collocated image block or the collocated image block has one or more candidate pixels that may include smoke, the candidate pixel detector 210 may designate the specific image block as a candidate block. The candidate pixel detector 210 may designate the pixels within the candidate block as candidate pixels. In such a scenario, the candidate pixel detector 210 may not analyze the candidate block to detect candidate pixels. Thereafter, the processor 202 may identify false-positive candidate pixels in the candidate block and then prune out such false-positive candidate pixels from the block.

In accordance with an embodiment, the processor 202 may check the one or more conditions, such as "Condition 1" and Condition 2", to identify a region in the current video frame. Such region may encompass a movement of the image-capturing device. The one or more conditions, such as "Condition 1" and "Condition 2", may be represented as:

$$N(|\vec{v}|^2>1 \ \& \ I_{edge}=1)/N(I\_edge)>0.15 \ \& \ \text{ratio\_smoke}<0.05 \quad \text{Condition 1:}$$

$$N(|\vec{v}|^2>1 \ \& \ I_{edge}=1)/N(I\_edge)>0.6 \quad \text{Condition 2:}$$

where, "$N(|\vec{v}|^2>1 \ \& \ I_{edge}=1)$" represents number of non-stationary edge pixels in the current video frame;
"$N(I\_edge)$" represents number of edge pixels in the current video frame; and
"ratio_smoke" represents a ratio of the number of candidate pixels to the total number of pixels in the current video frame.

Thus, the processor 202 may check the condition, "Condition 1", to determine whether the ratio of the number of non-stationary edge pixels to the total number of edge pixels in the current video frame is greater than a value, "15 percent". The processor 202 may check the percentage of smoke (such as the candidate pixels) in the current video frame is less than a value, "5 percent". Further, the processor 202 may check the condition, "Condition 2", to determine whether the ratio of the non-stationary edge pixels to the total number of edge pixels in the current video frame is greater than a value, "60 percent". If either of the two conditions is satisfied, the processor 202 may determine that the identified region (that includes the corresponding non-stationary edge pixels) is a motion-blurred region that encompasses a movement of at least the image-capturing device. The processor 202 may identify pixels encompassed within such identified motion-blurred region as false-positive candidate pixels and remove such identified pixels from the one or more candidate pixels.

In accordance with an embodiment, the processor 202 may use an artefact detection technique to identify regions that encompasses non-tissue objects (such as surgical instruments or surgical gauze) in the previous video frame from the one or more video frames. In accordance with an embodiment, during the smoke detection, the processor 202 may not consider such regions of the current video frame that correspond to the identified non-tissue regions of the previous video frame. Thus, the non-tissue regions of the previous video frame may be excluded during the identification of the candidate pixels in the current video frame. After the identification of the candidate pixels in the current video frame, the processor 202 may extend the span (or locations) of the non-tissue regions of the previous video frame in the current video frame, based on a dilation operation performed on such non-tissue regions. Thereafter, the processor 202 may determine an extent of overlap (or intersection) between one or more smoke blocks that include candidate pixels of the current video frame and the dilated non-tissue regions, as represented in the following expression:

$$I_{smoke} \cap ((I_{tool_{prev}}) \cup (I_{gauze_{prev}})) \quad (4)$$

where, "$I_{smoke}$" represents average pixel intensity of a smoke block that includes one or more candidate pixels in the current video frame;
"$(I_{tool_{prev}})$" represents average pixel intensity of a non-tissue block, such as a tool block, in the previous video frame;
"$(I_{gauze_{prev}})$" represents average pixel intensity of a non-tissue block, such as a gauze block, in the previous video frame.

The processor 202 may then compare the extent of overlap or intersection between the one or more smoke blocks and the dilated non-tissue regions with a third predetermined threshold, such as "95 percent". If the extent of overlap exceeds the third predetermined threshold, such as "95 percent", the processor 202 may identify the candidate pixels within such one or more smoke blocks as pixels of a motion-blurred region that encompasses the non-tissue object. Hence, if the dilated artefact (non-tissue) regions of the previous video frame are detected to be saturated with smoke, the smoke detected in such regions may be due to motion blur caused by the motion of such artefacts. Further, in an instance, the dilated artefact regions may also include shadows of the artefacts, such as tools and gauzes. The pruning engine 212 may remove all such identified pixels as false-positive candidate pixels from the one or more candidate pixels.

In accordance with an embodiment, the processor 202 may be further configured to check the one or more conditions, such as "Condition 3" and Condition 4", on the one or more candidate pixels. The processor 202 may prune the one or more candidate pixels based on the one or more conditions, such as "Condition 3" and Condition 4", represented as:

$$30 \leq I^{block \ avg} \leq 240 \quad \text{Condition 3:}$$

$$\max(R,G,B)-\min(R,G,B)<120 \quad \text{Condition 4:}$$

where, "$I^{block \ avg}$" represents average pixel intensity of an image block that includes candidate pixels;
"max(R,G,B)" represents a maximum value from the Red, Green, and Blue color components of a candidate pixel; and
"min(R,G,B)" represents a minimum value from the Red, Green, and Blue color components of a candidate pixel.

Thus, the processor 202 may check the condition, "Condition 3", to determine whether the average pixel intensity values of each image block that encompasses the candidate pixels that lie in a particular range, such as "30 to 240". Further, the processor 202 may check the condition, "Condition 4", to determine whether the difference between the minimum and maximum values of the RGB color components of each candidate pixel is less than a threshold value, such as "120". The processor 202 may identify candidate pixels for which one or more of the conditions, "Condition 3" and "Condition 4", are not satisfied. The pruning engine 212 may then remove such identified pixels as false-positive candidate pixels from the one or more candidate pixels. The condition, "Condition 3", may ensure that the pruned candidate pixels have moderate white values. Further, the condition, "Condition 4", may ensure that the pruned candidate pixels have low chroma values.

In accordance with an embodiment, the processor 202 may be further configured to check for a transient random texture within the current video frame. The processor 202 may be configured to compare the entropy determined for histogram of each image block of the difference image, "$E_{block\_i}$", with a fourth predetermined threshold, such as "0.9". Further, the processor 202 may be configured to compare the average pixel intensities of each image block in the difference image with a fifth predetermined threshold, such as "0.5". If the entropy of an image block is less than the fourth predetermined threshold, such as "0.9", and the average pixel intensity of that image block is greater than the fifth predetermined threshold, such as "0.5", the processor 202 may detect that the image block may have transient random texture. In accordance with an embodiment, the processor 202 may add the pixels of such detected image block to the one or more candidate pixels. This may assist in the detection of image blocks that may include smoke, but would otherwise not be detected due to the transient, random texture of such image blocks.

In accordance with an embodiment, the pruning engine 212 may be configured to prune the one or more candidate pixels by removal of the one or more false-positive candidate pixels from the one or more candidate pixels. The processor 202 may then determine a smoke region in the partially visible region in the current video frame, based on the pruning of the one or more candidate pixels. A person with ordinary skill in the art will understand that the values of the various predetermined thresholds are exemplary values. The values of the predetermined thresholds may vary, based on implementation and user requirements, without deviation from the scope of the disclosure.

In accordance with an embodiment, the camera control unit 218 may be configured to determine optimal values for one or more image-capture settings of the image-capturing device, based on the determination of the smoke region in the current video frame. Examples of the one or more image-capture settings may include, but are not limited to, an automatic exposure, an automatic focus, an automatic white balance, or an automatic illumination. In accordance with an embodiment, the optimal values of the one or more image-capture settings may be determined, based on one or more conditions, such as a size of the smoke region, an average intensity of pixels in the smoke region, or one or more features of the smoke region. In an embodiment, the determination of the optimal values may also be based on user-specified criteria. The camera control unit 218 may be configured to transmit the optimal values of the one or more image-capture settings to the image-capturing device, via the transceiver 204. The one or more image-capture settings of the image-capturing device may be adjusted based on the respective optimal values sent by the camera control unit 218.

In accordance with an embodiment, the UI manager 216 may present the optimal values of the one or more image-capture settings to the user, via the UI of the user terminal 108. The UI manager 216 may be enable the user to confirm or adjust the optimal values, via the UI of the user terminal 108. The UI manager 216 may receive a user input indicative of a confirmation or an adjustment of the optimal values from the user terminal 108, via the transceiver 204. Thereafter, the camera control unit 218 may update the optimal values, based on the user input, and transmit the updated optimal values to the image-capturing device, via the transceiver 204. The one or more image-capture settings of the image-capturing device may be adjusted based on the updated optimal values received from the camera control unit 218.

In accordance with an embodiment, the UI manager 216 may be configured to present a surgical scene interface to a user, such as a physician, of the user terminal 108. The surgical scene interface may be presented to the user on a display device of the user terminal 108, via a UI of the user terminal 108. In accordance with an embodiment, the surgical scene interface may be configured to display the one or more video frames including the current video frame to the user. The detected smoke region may be masked or highlighted in the current video frame displayed to the user, via the surgical scene interface. Exemplary scenarios of the surgical scene interface has been explained in FIGS. 5A and 5B.

In accordance with an embodiment, the UI manager 216 may be further configured to generate a notification indicative of the determination of the smoke region in the current video frame. The UI manager 216 may send the generated notification to the user terminal 108. The notification may be presented to the user, via the UI of the user terminal 108. In case of real-time or online analysis of the one or more video frames for determination of the smoke region, the UI manager 216 may also transmit the generated notification to surgical device 102, via the transceiver 204. Examples of the notification may include, but are not limited to, an audio alert, a textual alert, a visual alert, and/or a haptic feedback.

Figure 3:
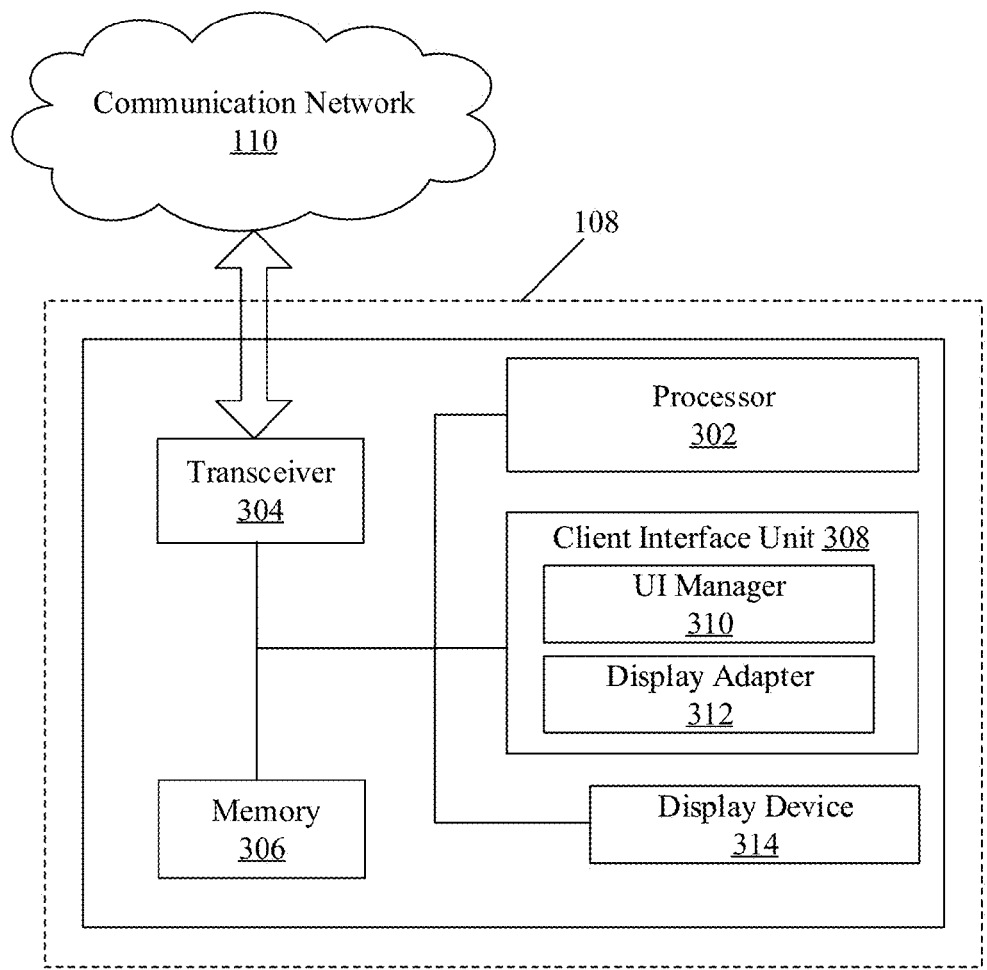
FIG. 3 is a block diagram that illustrates an exemplary user terminal, in accordance with an embodiment of the disclosure.

FIG. 3 is a block diagram that illustrates an exemplary user terminal, in accordance with an embodiment of the disclosure. FIG. 3 is explained in conjunction with elements from FIG. 1. With reference to FIG. 3, there is shown the user terminal 108. The user terminal 108 may comprise one or more processors, such as a processor 302, one or more transceivers, such as a transceiver 304, a memory 306, a client interface unit 308, and a display device 314. The client interface unit 308 may include a UI manager 310 and a display adapter 312. The processor 302 may be communicatively coupled to the transceiver 304, the memory 306, the client interface unit 308, and the display device 314. The transceiver 304 may be configured to communicate with the image processing server 104 and/or the surgical device 102, via the communication network 110.

The processor 302 may comprise suitable logic, circuitry, interfaces, and/or code that may be configured to execute a set of instructions stored in the memory 306. The processor 302 may be implemented, based on a number of processor technologies known in the art. Examples of the processor 302 may be an X86-based processor, a Reduced Instruction Set Computing (RISC) processor, an Application-Specific Integrated Circuit (ASIC) processor, a Complex Instruction Set Computing (CISC) processor, and/or other processors.

The transceiver 304 may comprise suitable logic, circuitry, interfaces, and/or code that may be configured to communicate with the image processing server 104 and/or the surgical device 102, via the communication network 110 (as shown in FIG. 1). The transceiver 304 may implement known technologies to support wired or wireless communication of the user terminal 108 with the communication network 110. The transceiver 304 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The transceiver 304 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The memory 306 may comprise suitable logic, circuitry, and/or interfaces that may be configured to store a machine code and/or a computer program with at least one code section executable by the processor 302. Examples of implementation of the memory 306 may include, but are not limited to, Random Access Memory (RAM), Read Only Memory (ROM), Hard Disk Drive (HDD), and/or a Secure Digital (SD) card.

The client interface unit 308 may comprise suitable logic, circuitry, interfaces, and/or code that may be configured to render and manage one or more UIs presented on the user terminal 108. In accordance with an embodiment, the client interface unit 308 may be a part of the processor 302. Alternatively, the client interface unit 308 may be implemented as a separate processor or circuitry in the user terminal 108. For example, the client interface unit 308 may be implemented as a dedicated graphics processor or chipset, communicatively coupled to the processor 302. In accordance with an embodiment, the client interface unit 308 and the processor 302 may be implemented as an integrated processor, or a cluster of processors, which perform the functions of the client interface unit 308 and the processor 302. In accordance with another embodiment, the client interface unit 308 may be implemented as a computer program code, stored in the memory 306, which on execution by the processor 302 may perform the functions of the client interface unit 308.

The UI manager 310 may comprise suitable logic, circuitry, interfaces, and/or code that may be configured to manage the UI of the user terminal 108. In accordance with an embodiment, the UI manager 310 may be further configured to receive and process user input received via the UI of the user terminal 108, via an input device (not shown in FIG. 3) of the user terminal 108. In accordance with an embodiment, the input device may be communicatively coupled to (or included within) the user terminal 108. Examples of the input device may include, but are not limited to, a keyboard, a mouse, a joy stick, a track pad, a voice-enabled input device, a touch-enabled input device, and/or a gesture-enabled input device.

In accordance with an embodiment, the UI manager 310 may be further configured to communicate with the UI manager 216, of the image processing server 104, via the transceiver 304. Such communication may facilitate receipt of information that corresponds to the surgical scene interface. Thereafter, the UI manager 310 may present the surgical scene interface via the UI of the user terminal 108.

The display adapter 312 may comprise suitable logic, circuitry, interfaces, and/or code that may be configured to interface the UI manager 310 with the display device 314. In accordance with an embodiment, the display adapter 312 may perform an adjustment of rendering and display properties of the UI of the user terminal 108, based on display configurations of the display device 314. Examples of one or more techniques that may be employed to perform the display adjustment may include, but are not limited to, image enhancement, image stabilization, contrast adjustment, brightness adjustment, resolution adjustment, and/or skew/rotation adjustment.

The display device 314 may comprise suitable logic, circuitry, interfaces, and/or code that may be configured to render the UI. In accordance with an embodiment, the display device 314 may be implemented as a part of the user terminal 108. In another embodiment, the display device 314 may be communicatively coupled to the user terminal 108. The display device 314 may be realized through several known technologies such as but not limited to, Cathode Ray Tube (CRT) based display, Liquid Crystal Display (LCD), Light Emitting Diode (LED) based display, Organic LED display technology, and Retina display technology. In addition, in accordance with an embodiment, the display device 314 may receive input from the user. In such a scenario, the display device 314 may be a touch screen that enables the user to provide the input. In accordance with an embodiment, the touch screen may correspond to at least one of a resistive touch screen, a capacitive touch screen, or a thermal touch screen. In accordance with an embodiment, the display device 314 may receive the input through a virtual keypad, a stylus, a gesture-based input, and/or a touch-based input. In such a case, the input device may be integrated within the display device 314. In addition, in accordance with an embodiment, the user terminal 108 may include a secondary input device apart from a touch-screen-based display device 314.

In operation, the transceiver 304 of the user terminal 108 may receive information that may correspond to the surgical scene interface from the UI manager 216, of the image processing server 104, via the communication network 110. Thereafter, in accordance with an embodiment, the UI manager 310 of the user terminal 108 may present the surgical scene interface to the user, via the UI of the user terminal 108. In accordance with an embodiment, the surgical scene interface may present the one or more video frames including the current video frame to the user. In accordance with an embodiment, the smoke regions determined in the current video frame may be masked or highlighted when the current video frame is displayed to the user. An example of the surgical scene interface is explained in more detail in FIG. 5B.

In accordance with an embodiment, the one or more video frames presented by the surgical scene interface may be a real-time video footage captured by the image-capturing device while the surgical or diagnostic procedure is performed. In such a case, the image processing server 104 may analyze the one or more video frames on a real-time basis (online processing) to determine the smoke region in the current video frame of the one or more video frames. The determined smoke region may be simultaneously presented to the user as a masked or highlighted region in the current video frame, via the surgical scene interface.

In accordance with an embodiment, the surgical scene interface may be further configured to present a notification to the user to indicate the determined smoke region. Examples of the notification may include, but are not limited to, an audio alert, a textual alert, a visual alert, and/or a haptic alert. The user (such as the physician) may be prompted to take an action based on the notification. For instance, the surgical scene interface may prompt the user to adjust the one or more image-capture settings of the image-capturing device. In accordance with an embodiment, the camera control unit 218 of the image processing server 104 may be configured to determine optimal values for the one or more image-capture settings, based on the determination of the smoke region. The surgical scene interface may present these optimal values to the user as suggested values for the one or more image-capture settings. The user may adjust the one or more image-capture settings of the image-capturing device, based on the suggested values presented to the user. In addition to adjustment of the one or more image-capture settings of the image-capturing device, the user (such as the physician) may perform a smoke removal procedure to clear the smoke from the anatomical region of the patient.

Figure 4:
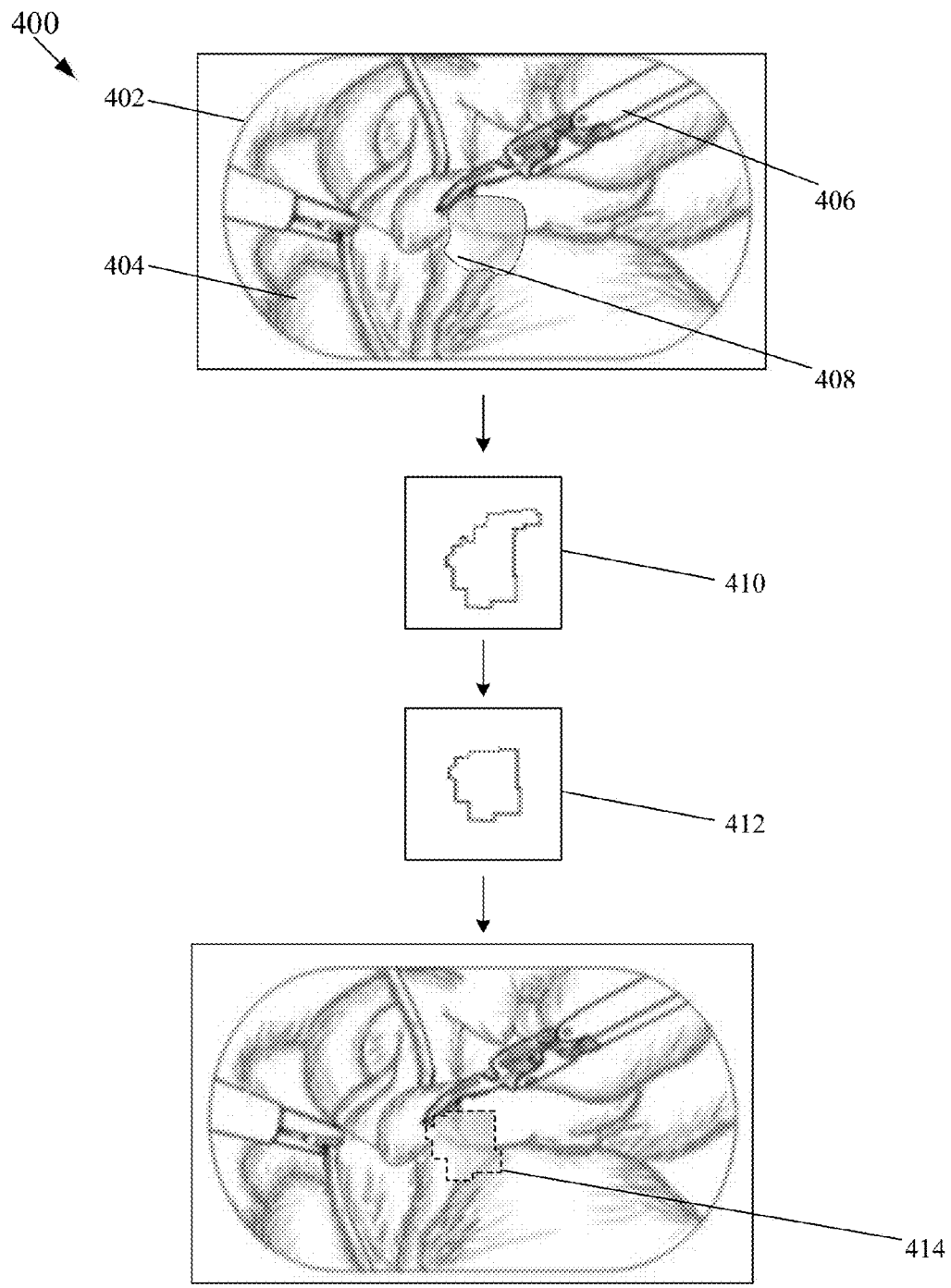
FIG. 4 illustrates an exemplary flow diagram that illustrates a method for smoke detection in a video frame of an anatomical surgery, in accordance with an embodiment of the disclosure.

FIG. 4 illustrates an exemplary flow diagram that illustrates a method for smoke detection in a video frame of an anatomical surgery, in accordance with an embodiment of the disclosure. FIG. 4 has been described in conjunction with elements from FIGS. 1 and 2. With reference to FIG. 4, there is shown a flow diagram 400. The flow diagram 400 comprises a video frame 402, an anatomical region 404, a surgical instrument 406, one or more candidate pixels 410, pruned candidate pixels 412, and smoke region 414. The flow diagram 400 illustrates a snapshot of a video frame that may be captured by the image-capturing device during a surgical or diagnostic procedure (illustrated as the video frame 402). The video frame 402 illustrates the anatomical region 404 on which the surgical or diagnostic procedure may be performed by use of the surgical instrument 406. The video frame 402 further illustrates a partially visible region 408 that may encompass a smoke region.

The candidate pixel detector 210 of the image processing server 104 may be configured to analyze the video frame 402, to estimate the partially visible region 408. The candidate pixel detector 210 may be further configured to detect the one or more candidate pixels 410 in the partially visible region 408. In accordance with an embodiment, the processor 202 of the image processing server 104 may be configured to determine one or more false-positive candidate pixels from the one or more candidate pixels 410. The pruning engine 212 may be configured to prune the one or more candidate pixels 410, based on removal of the determined one or more false-positive candidate pixels from the one or more candidate pixels 410. The pruned candidate pixels have been illustrated by 412 in the flow diagram 400. The processor 202 may be further configured to determine the smoke region 414 in video frame 402, based on the pruned candidate pixels 412.

Figure 5A:
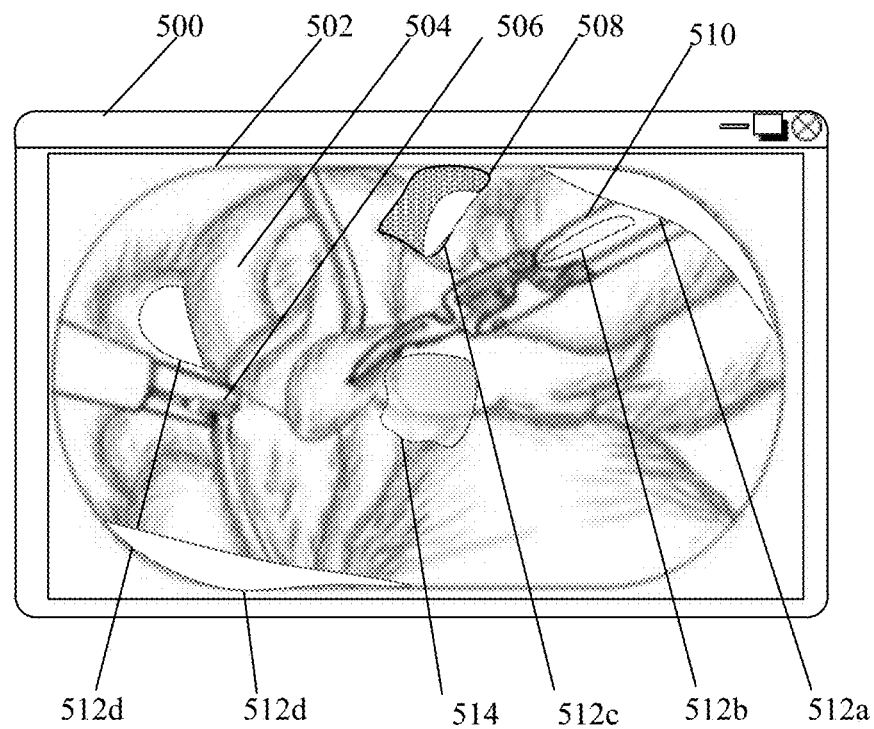
FIGS. 5A and 5B illustrate exemplary scenarios of user interfaces (UIs) that may be presented on a user terminal, in accordance with an embodiment of the disclosure.
Figure 5B:
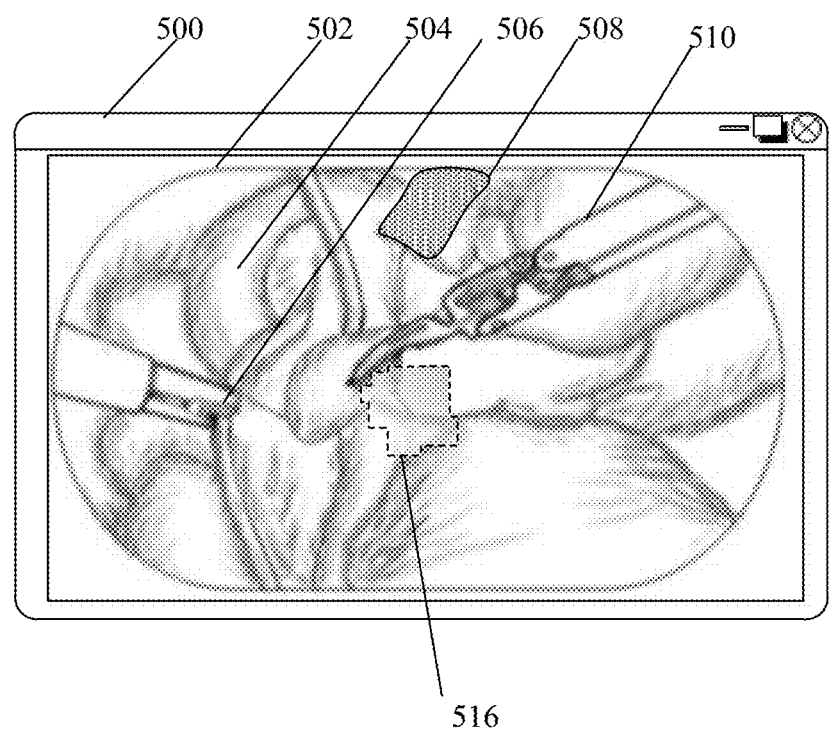

FIGS. 5A and 5B illustrate exemplary scenarios of UIs that may be presented on the user terminal 108, in accordance with an embodiment of the disclosure. FIGS. 5A and 5B have been described in conjunction with elements of FIG. 1. With reference to FIGS. 5A and 5B, there is shown instances of a user interface (UI) 500, which may be presented to the user of the user terminal 108.

With regard to FIG. 5A, there is shown a first exemplary scenario of the UI 500. The UI 500 may be configured to display a surgical scene interface 502 to present the one or more video frames to the user. For instance, as shown in FIG. 5A, the surgical scene interface 502 may display a video frame that includes a snapshot of a perspective, cross-sectional view of an anatomical region 504 of a patient. The snapshot may be captured while a surgical or diagnostic procedure is performed on the anatomical region 504. As illustrated in the snapshot, the surgical or diagnostic procedure may be performed by use of one or more surgical gauzes, such as surgical gauze 508, and one or more surgical instruments, such as a surgical forceps 506 and an endoscopic surgical instrument 510. For instance, as shown in FIG. 5A, a surface of the anatomical region 504 may be held by use of the surgical forceps 506, when the surgical or diagnostic procedure is performed by use of the endoscopic surgical instrument 510. Further, the surgical gauze 508 may be used to absorb blood or other body fluids that may ooze out while the surgical or diagnostic procedure is performed. Though, single surgical gauze and two surgical instruments are shown in FIG. 5A, one or more additional surgical gauzes and/or surgical instruments may also be used to perform the surgical or diagnostic procedure, without departure from the scope of the disclosure. As shown in FIG. 5A, the snapshot further illustrates various partially visible regions, such as a first region 512a, a second region 512b, a third region 512c, a fourth region 512d, a fifth region 512e, and a sixth region 514.

In operation, prior to the display of a particular video frame in the surgical scene interface 502, the image processing server 104 may analyze the video frame. In an embodiment, the candidate pixel detector 210 of the image processing server 104 may estimate the regions 512a to 512e and 514 as the partially visible regions of the video frame illustrated in FIG. 5A. Thereafter, the candidate pixel detector 210 may detect one or more candidate pixels in each partially visible region of the video frame. Further, the pruning engine 212 of the image processing server 104 may prune the one or more candidate pixels, based on removal of the one or more false-positive candidate pixels from the one or more candidate pixels. In accordance with an embodiment, the one or more false-positive candidate pixels may correspond to a motion-blurred region or a halo-effected region of the video frame.

For instance, the first region 512a may be a halo-affected region that may surround the endoscopic surgical instrument 510. The regions 512b to 512e may be motion-blurred regions in the video frame. The second region 512b may be affected by a motion blur caused by a movement of the endoscopic surgical instrument 510. The third region 512c may be motion-blurred due to a movement of the surgical gauze 508. In addition, the fourth region 512d may be affected by a motion blur due to a movement of a tissue of the anatomical region 504, near the surgical forceps 506. Further, the fifth region 512e may be a region that may be motion-blurred due to a movement to the image-capturing device. The processor 202 may determine that the regions 512a to 512e encompass false-positive candidate pixels.

With reference to FIG. 5B, there is shown a second exemplary scenario of the UI 500 when the pruning engine 212 removes such false-positive candidate pixels from the one or more candidate pixels, to prune the candidate pixels. The processor 202 may determine that only the sixth region 514 (FIG. 5A) is a smoke region, based on the pruning of the candidate pixels. The surgical scene interface 502 may mask or highlight the smoke region determined in the video frame, while the video frame is presented to the user. For instance, the sixth region 514 may be determined as the smoke region in the video frame. As illustrated in the snapshot of the video frame in FIG. 5B, the sixth region 514 may be marked by a dotted boundary 516 to highlight the smoke in the sixth region 514.

In accordance with an embodiment, the surgical scene interface 502 may be further configured to present a notification to the user to indicate determination of the smoke region, such as the sixth region 514, encompassed by the dotted boundary 516 in the video frame. Examples of the notification may include, but are not limited to, an audio alert, a textual alert, a visual alert, and/or a haptic alert. In case the video frame is presented in real time, the surgical scene interface 502 may prompt the user (such as the physician) to take a particular action based on the notification. For instance, the surgical scene interface 502 may prompt the user to adjust the one or more image-capture settings of the image-capturing device. The surgical scene interface 502 may suggest optimal values for the one or more image-capture settings. The user may adjust the one or more image-capture settings of the image-capturing device, based on the suggested optimal values presented to the user. In addition to adjustment of the one or more image-capture settings of the image-capturing device, the user (such as the physician) may perform a smoke removal procedure to clear the smoke from the anatomical region of the patient. A person with ordinary skill in the art will understand that the UI 500 has been provided for exemplary purposes and should not be construed to limit the scope of the disclosure.

Various embodiments of the disclosure may encompass numerous advantages. As discussed above, the image processing server 104 may analyze the one or more video frames to determine the smoke region in the current video frame from the one or more video frames in real time. During analysis of the one or more video frames, the image processing server 104 may estimate the partially visible region in the current video frame and then detect candidate pixels in the partially visible region. The image processing server 104 may then prune out the false-positive candidate pixels from the detected candidate pixels to determine the smoke region. Such false-positive candidate pixels may lie in regions effected by motion blur or halo effects, and hence, may appear similar to smoke. Thus, removal of such false-positive candidate pixels may increase the accuracy and robustness of the smoke detection by the image processing server 104.

During the surgical or diagnostic procedure, the image processing server 104 may provide a notification to a physician in real time that may indicate the detection of smoke. Based on the real-time notification, the physician may initiate a smoke removal procedure while the surgical or diagnostic procedure is performed. Further, as discussed, the image processing server 104 may also enable the physician to adjust the one or more image-capture settings of the image-capturing device, based on the determination of the smoke region in the current video frame. Such adjustment in the one or more image-capture settings may help in improvement of the quality of the one or more video frames captured by the image-capturing device in real time.

Figure 6:
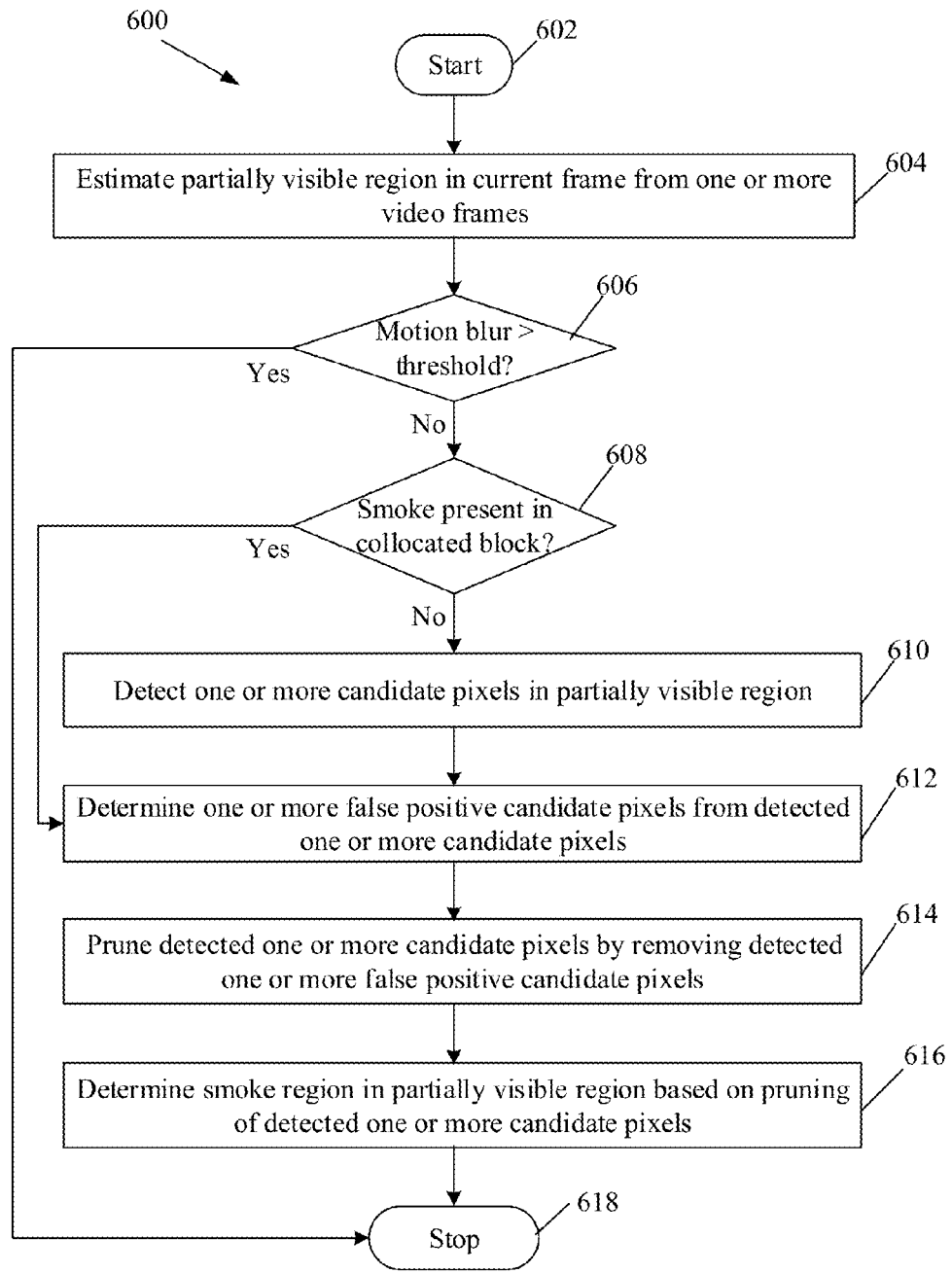
FIG. 6 is an exemplary flow chart that illustrates an exemplary method for smoke detection during an anatomical surgery, in accordance with an embodiment of the disclosure.

FIG. 6 is an exemplary flow chart that illustrates an exemplary method for smoke detection during an anatomical surgery, in accordance with an embodiment of the disclosure. With reference to FIG. 6, there is shown a flow chart 600. The flow chart 600 is described in conjunction with FIGS. 1 and 2. The method starts at step 602 and proceeds to step 604.

At step 604, a partially visible region may be estimated in a current video frame from one or more video frames. In accordance with an embodiment, the one or more video frames may be captured by the image-capturing device, during a surgical or diagnostic procedure that is performed on an anatomical region of a patient. In accordance with an embodiment, the candidate pixel detector 210 of the image processing server 104 may be configured to estimate the partially visible region in the current video frame. In accordance with an embodiment, the partially visible region may be estimated, based at least on a temporal difference between the current video frame and a previous video frame from the one or more video frames.

At step 606, a check is performed to determine whether an extent of motion blur in the video frame exceeds a predetermined motion blur threshold. In accordance with an embodiment, the processor 202 of the image processing server 104 may be configured to compare the extent of motion blur within the video frame with the predetermined threshold. For instance, the processor 202 may analyze the video frame to determine the regions that include motion blur within the video frame. Thereafter, the processor 202 may determine the size and/or average intensity of pixels in such regions. The processor 202 may compare the size of the motion blurred regions with a size threshold and the average pixel intensity of the motion blurred regions with an intensity threshold. If the size and the average pixel intensity of the motion blurred regions exceed the size threshold and the intensity threshold, respectively, the processor 202 may determine that the extent of motion blur in the video frame exceeds the predetermined motion blur threshold. If the extent of motion blur in the video frame exceeds the predetermined motion blur threshold, control passes to end step 618. Thus, in this case, the determination of smoke in the video frame may be skipped and the video frame may not be processed and/or analyzed further. Otherwise, control passes to step 608.

At step 608, a check is performed to determine whether smoke is present within a collocated image block of the video frame. In accordance with an embodiment, the candidate pixel detector 210 may be configured to check whether smoke is present in the collocated image block of the video frame. The collocated image block may correspond to an image block that may lie in a vicinity of a particular image block under analysis. When smoke is present in the collocated image block or the collocated image block has one or more candidate pixels that may include smoke, the candidate pixel detector 210 may designate the particular image block as a candidate block. The candidate pixel detector 210 may designate the pixels within such a block as candidate pixels. In such a scenario, the candidate pixel detector 210 may not analyze this block to detect candidate pixels. Hence, step 610 may be skipped in such a scenario, and control may pass to step 612. However, in case smoke is not present in the collocated image block and/or candidate pixels are not detected within the collocated image block, control may pass to step 610.

At step 610, one or more candidate pixels may be detected in the estimated partially visible region. In accordance with an embodiment, the candidate pixel detector 210 may be configured to detect the one or more candidate pixels in the estimated partially visible region. In an embodiment, the one or more candidate pixels may be detected based at least on a difference of average intensity of corresponding image blocks of the current video frame and the previous video frame. In accordance with an embodiment, the one or more candidate pixels may correspond to one or more of, but not limited to, a smoke block, a tissue block, or a non-tissue block.

At step 612, one or more false-positive candidate pixels may be determined from the detected one or more candidate pixels. In accordance with an embodiment, the processor 202 of the image processing server 104 may be configured to determine the one or more false-positive candidate pixels from the detected one or more candidate pixels. Examples of the one or more false-positive candidate pixels may include, but are not limited to, a first set of pixels in a motion-blurred region in the current video frame and a second set of pixels in a halo-effected region in the current video frame.

At step 614, the detected one or more candidate pixels may be pruned. In accordance with an embodiment, the pruning engine 212 may be configured to prune the detected one or more candidate pixels by removal of the determined one or more false-positive candidate pixels from the detected one or more candidate pixels.

At step 616, a smoke region may be determined in the estimated partially visible region of the current video frame. In accordance with an embodiment, the processor 202 may be configured to determine the smoke region in the estimated partially visible region, based on the pruning of the detected one or more candidate pixels. Control passes to end step 618.

In accordance with an embodiment of the disclosure, a system for smoke detection during an anatomical surgery is disclosed. The system may comprise the image processing server 104, communicatively coupled to the image-capturing device (not shown in FIG. 1), via the communication network 110. The image-capturing device may be configured to capture one or more video frames during the anatomical surgery. The image processing server 104 may be configured to estimate a partially visible region in a current video frame, based on a temporal difference between the current video frame and a previous video frame from the one or more video frames. The image processing server 104 may be further configured to detect one or more candidate pixels in the estimated partially visible region in the current video frame. In addition, the image processing server 104 may be configured to determine a smoke region in the partially visible region, based on pruning of the detected one or more candidate pixels.

Various embodiments of the disclosure may provide a non-transitory computer readable medium and/or storage medium, and/or a non-transitory machine readable medium and/or storage medium having stored thereon, a machine code and/or a computer program having at least one code section executable by a machine and/or a computer for smoke detection during an anatomical surgery. The at least one code section in the image processing server 104 may cause the machine and/or computer to perform the steps that comprise the estimation of a partially visible region in a current video frame, based on a temporal difference between the current video frame and a previous video frame from the one or more video frames. The one or more video frames may be captured by the image-capturing device, which may be communicatively coupled to the image processing server 104, via the communication network 110. In accordance with an embodiment, one or more candidate pixels may be detected in the estimated partially visible region in the current video frame. Further, a smoke region may be determined in the partially visible region, based on pruning of the detected one or more candidate pixels.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An apparatus, comprising:
circuitry configured to:
capture at least one video frame of an anatomical region of a user;
estimate a partially visible region in a current video frame of said anatomical region based on a temporal difference between said current video frame and a previous video frame of said anatomical region;
detect at least one candidate pixel in said estimated partially visible region in said current video frame based on a difference of average intensity of corresponding image blocks of said current video frame and said previous video frame;
determine at least one false-positive candidate pixel from said detected at least one candidate pixel;
prune said at least one false-positive candidate pixel from said detected at least one candidate pixel; and
determine a smoke region in said partially visible region based on said pruned at least one candidate pixel.

2. The apparatus of claim 1, wherein said at least one candidate pixel corresponds to at least one of a smoke block, a tissue block, or a non-tissue block.

3. An apparatus, comprising:
circuitry configured to:
capture at least one video frame;
estimate a partially visible region in a current video frame based on a temporal difference between said current video frame and a previous video frame;
detect at least one candidate pixel in said estimated partially visible region in said current video frame based on a difference of average intensity of corresponding image blocks of said current video frame and said previous video frame;
prune at least one false-positive candidate pixel from said detected at least one candidate pixel; and
determine a smoke region in said partially visible region based on said pruned at least one false-positive candidate pixel from said detected at least one candidate pixel,
wherein said at least one false-positive candidate pixel comprise at least one of a first set of pixels in a motion-blurred region in said current video frame or a second set of pixels in a halo-effected region in said current video frame.

4. The apparatus of claim 3, wherein said motion-blurred region corresponds to a region in said current video frame that encompasses a movement of at least one of the apparatus, a non-tissue object, or a tissue portion.

5. The apparatus of claim 3, wherein said circuitry is further configured to detect said motion-blurred region by use of at least one of an optical flow based technique or an artefact detection technique.

6. The apparatus of claim 5, wherein said circuitry is further configured to identify at least one first edge pixel in said current video frame and at least one second edge pixel in said previous video frame by use of an edge detection technique, wherein said motion-blurred region is detected based at least on a difference in location of said at least one first edge pixel from said at least one second edge pixel.

7. The apparatus of claim 3, wherein said circuitry is further configured to detect said halo-effected region based on a region growth rate estimation technique.

8. The apparatus of claim 1, wherein said estimation of said partially visible region is based on an entropy of a histogram of said temporal difference between said current video frame and said previous video frame.

9. The apparatus of claim 1, wherein said circuitry is further configured to adjust at least one image-capture setting to capture said at least one video frame, based on said determination of said smoke region, wherein said at least one image-capture setting comprises at least one of an automatic exposure, an automatic focus, an automatic white balance, or an automatic illumination.

10. The apparatus of claim 1, further comprising:
a display screen,
wherein said circuitry is further configured to display said current video frame via a user interface rendered on the display screen, and wherein said determined smoke region is at least masked or highlighted in said displayed current video frame.

11. The apparatus of claim 1, wherein said circuitry is further configured to generate a notification indicative of said determination of said smoke region, and wherein said notification corresponds to at least one of an audio alert, a textual alert, a visual alert, or a haptic alert.

12. A method, comprising:
capturing at least one video frame of an anatomical region of a user;
estimating a partially visible region in a current video frame of said anatomical region based on a temporal difference between said current video frame and a previous video frame of said anatomical region;
detecting at least one candidate pixel in said estimated partially visible region in said current video frame based on a difference of average intensity of corresponding image blocks of said current video frame and said previous video frame;
determining at least one false-positive candidate pixel from said detected at least one candidate pixel;
pruning said at least one false-positive candidate pixel from said detected at least one candidate pixel; and
determining a smoke region in said partially visible region based on pruning of said detected at least one candidate pixel.

13. The method of claim 12, wherein said at least one candidate pixel corresponds to at least one of a smoke block, a tissue block, or a non-tissue block.

14. The method of claim 12, further comprising determining at least one false-positive candidate pixel from said detected at least one candidate pixel, wherein said pruning of said detected at least one candidate pixel further comprises removal of said at least one false-positive candidate pixel from said detected at least one candidate pixel.

15. The method of claim 14, wherein said at least one false-positive candidate pixel comprise at least one of a first set of pixels in a motion-blurred region in said current video frame or a second set of pixels in a halo-effected region in said current video frame.

16. The method of claim 12, further comprising adjusting at least one image-capture setting to capture said at least one video frame, based on said determination of said smoke region,
wherein said at least one image-capture setting comprises at least one of an automatic exposure, an automatic focus, an automatic white balance, or an automatic illumination.

17. The method of claim 12, further comprising displaying said current video frame via a user interface rendered on a display screen, wherein said determined smoke region is at least masked or highlighted in said displayed current video frame.

18. The method of claim 12, further comprising generating a notification indicative of said determination of said smoke region, wherein said notification corresponds to at least one of an audio alert, a textual alert, a visual alert, or a haptic alert.

19. A non-transitory computer-readable medium having stored thereon, computer-executable instructions for causing a computer to execute operations, the operations comprising:
capturing at least one video frame of an anatomical region of a user;
estimating a partially visible region in a current video frame of said anatomical region based on a temporal difference between said current video frame and a previous video frame of said anatomical region;
detecting at least one candidate pixel in said estimated partially visible region in said current video frame based on a difference of average intensity of corresponding image blocks of said current video frame and said previous video frame;
determining at least one false-positive candidate pixel from said detected at least one candidate pixel;
pruning said at least one false-positive candidate pixel from said detected at least one candidate pixel; and
determining a smoke region in said partially visible region based on pruning of said detected at least one candidate pixel.

* * * * *